United States Patent
Jean Henry-Labordere

(10) Patent No.: US 6,832,089 B2
(45) Date of Patent: Dec. 14, 2004

(54) IMPLEMENTATION OF SHORT MESSAGES SENDING TO MOBILE NETWORKS WITH MOBILE NUMBER PORTABILITY OR INCOMPLETE NUMBER PLANS WITH AUTOLEARNING

(75) Inventor: Arnaud Luglien Charles Jean Henry-Labordere, Paris (FR)

(73) Assignee: Nilcom, Paris (FR)

( * ) Notice: Subject to any disclaimer, the term of this patent is extended or adjusted under 35 U.S.C. 154(b) by 529 days.

(21) Appl. No.: 09/896,558

(22) Filed: Jun. 29, 2001

(65) Prior Publication Data

US 2003/0013464 A1 Jan. 16, 2003

(51) Int. Cl.7 .............................................. H04Q 7/20
(52) U.S. Cl. ................... 455/445; 455/445; 455/432.1; 455/432.2; 455/433
(58) Field of Search ................................ 455/408, 445, 455/456.1, 433, 412.1, 466, 560, 432.1, 432.2

(56) References Cited

U.S. PATENT DOCUMENTS

| | | | |
|---|---|---|---|
| 5,878,347 A | | 3/1999 | Joensuu et al. |
| 6,064,887 A | * | 5/2000 | Kallioniemi et al. ........ 455/445 |
| 6,463,270 B1 | * | 10/2002 | Chang et al. ............... 455/403 |

FOREIGN PATENT DOCUMENTS

| WO | WO 97/36451 | 10/1997 |
|---|---|---|
| WO | WO 98/18269 | 4/1998 |
| WO | WO 99/11087 | 3/1999 |

OTHER PUBLICATIONS

Yi–Bing Lin; A Cache Approach for Supporting Life–time UPT Number; Wireless Networks; vol. 2, Issue 2 (Jun. 1996) pp.: 155–160 Year of Publication: 1996.*

Copy of French Search Report dated Jul. 10, 2002.

"A Cache Approach for Supporting Life–Time UPT Number" Wireless Networks, ACM, US vol. 2, No. 2, Jun. 1, 1996 pp 155–160.

"Portabilitaet Von Rufnummern In Mobilfunknetzen" Funkschau, Franzis–Verlag K.G. Munchen, Germany, vol. 73, No. 4, Feb. 4, 2000, pp 48–50.

* cited by examiner

*Primary Examiner*—Nguyen T. Vo
*Assistant Examiner*—Randy Peaches
(74) *Attorney, Agent, or Firm*—Baker & Daniels

(57) ABSTRACT

Implementation of the sending of short messages to mobile networks with mobile number portability in the same country comprising a computer with SS7 connections able to interrogate all the HLRs of the country where MNP is implemented, being located in an other country or the same. The computer includes a memory cache for all the subscribers of the country which allow to know which HLR to interrogate without searching one they have been found. The memory cache is initially empty and builds once by search of the HLRs when a subscriber does not exist yet in the cache, or when he is ported-out, that is, change its network.

5 Claims, 3 Drawing Sheets

IMPLEMENTATION OF SHORT MESSAGES SENDING TO MOBILE NETWORKS WITH MOBILE NUMBER PORTABILITY OR INCOMPLETE NUMBER PLANS WITH AUTOLEARNING

The Mobile Terminated sending of the short messages (SMS-MT) is described in reference GSM (Global System Mobile) documents. It involves a 3 stage process:

a) From the Destination Address of the handset, use a look-up table (called HLR levels which gives the address of the Home Location Register (HLR) of this subscriber such as:

| Min | Max | HLR address | Network Name |
|---|---|---|---|
| +85288800000 | +85288899999 | +85288700001 | A |
| +85288700099 | +85288799999 | +85288700002 | A |
| +85298800100 | +85298899999 | +85298800000 | B |
| +85293300010 | +85293399999 | +85293300001 | C |
| +85293500000 | +85293599999 | +85293300002 | C |

According to this example, the HLR address for the subscriber of Network A which has +85288712345 is immediately found to be +85288700001.

b) Send a request (Send Routing Info (SRI)) to this HLR to obtain the address of the visited MSC (Mobile Switch Centre).

c) Send a Forward Short Message Mobile Terminated (SMSMT) to the visited MSC which will relay to the Destination Address handset. In case of failure, various classical retry schemes may be used.

However this process must be adapted, according to the invention for certain cases.

Case of Mobile Number Portability

Several countries such as Netherlands, Hong-Kong, United Kingdom and many other in the future have implemented the Mobile Number Portability (MNP) feature. In order to develop the competition between the mobile operators, the MNP allows a subscriber to keep the same number even if he changes to an other Mobile network of the same country (MNP country).

As a result, it is not possible to know, from the handset number, which network it belongs and which precise HLR to interrogate. In the above example, a handset +85288712345 could belong to network C if it has been port-out from network A to network C.

Case of Incompletely Known HLR Levels with SMS Interworking.

For large networks, the number of HLR levels could be several hundred intervals (around 1000 for the largest, such as France Telecom) because of the number of HLRs and the evolutionary nature of the new numbers being added as the number of subscribers increase.

In the case where several networks have agreed to allow SMS to be sent from one network to an other; each need to send update to all its interworking partners whenever he adds a new HLR level, otherwise the other partners could not send SMS to the subscribers which have been added. An alternative is also to set a Common National Gateway which will have all the updates.

In any case, the initial set-up of a large number of HLR levels, and their maintenance, would require a large human administration if it was not performed automatically as the present invention does.

DESCRIPTION OF THE MOBILE NUMBER PORTABILITY IMPLEMENTATION

Components of the Invention

The invention consists of

Figure 1:
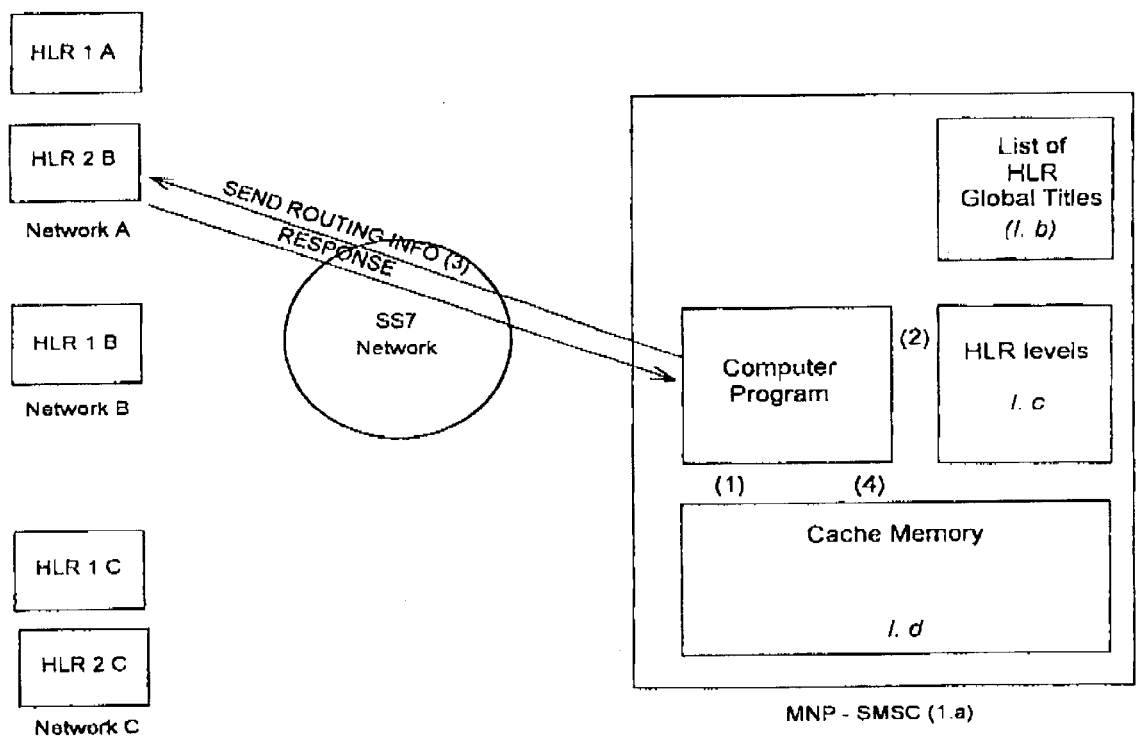

A computer (MNP-SMSC) connected to the SS7 network (Signalling System 7 used to connect the GSM operators) and capable of sending request and receiving responses from all the HLR of the MNP country (FIG. 1.a).

This MNP-SMSC function is unique for the MNP country. It can be located with an operator of another country, which has roaming agreements with all the operators of the MNP country or in the premises of the administration providing the International Gateway Function, so that the MNP-SMSC can also address all the HLRs, A fixed table of all the HLR addresses of the various operators, this table can be built by a search engine FIG. 1.b, An HLR level table which is empty at the beginning because which HLR correspond to a given official interval of numbers is not necessarily known (FIG. 1.c), A large cache memory, which is also empty at the beginning, and which allows by a quick local memory search with the handset number as argument, to find its HLR address, if it exists in the table (whether port-out or not to an other network) without having to interrogate the HLRs while performing a search. This cache memory is necessary so not to make unnecessary interrogations of the various HLRs. (FIG. 1.d), A computer program capable of addressing a Send Routing Info to a given HLR once to port-in an other it has decided the address, and then capable of retrying, or sending the SMS-MT, if the subscriber is found.

In the alter case, if the subscriber does not yet exist in the cache memory, it is entered so that no further search will be necessary. Unless the number is port-out to an other network, in which case a search will be necessary to find which HLR it has been port-out. So the case where a search is necessary is only at the beginning (once) and every time the subscriber changes his subscription operator. So this is very unfrequented.

Additionally, the invention may consist of a "Conversion Unit" installed at each operator which wants to have the MNP feature to send SMS to all his subscribers (regular or port-in) or to the others. The Conversion Unit is basically the same as the MNP-MSC but does not require a large cache memory.

DESCRIPTION OF OPERATION

It is necessary to consider the process of sending a SMS-MT from an operator A to the operator. Operator A (whether in the same country or not) must first send the SMS to the MNP-SMSC as explained in details on FIG. 1.

The MNP-SMSC first look (1) in the cache memory if its finds the Destination Address. If it does not, it will search the HLRs, starting with the "normal" HLR (2) of the HLR levels (non port-out number) corresponding to the highest probability p1. If it does not find, it will look at the HLRs (3) in the order $$p_1/C_1 > p_2/c_2 > \ldots > p_n/C_n$$

where pi is the probability of finding the Destination Address in the HLRi and ci is the search cost for that HLR. It car be demonstrated that this is the search order which minimises the cost among all the nl (factorial n) possible order for searching the n HLRs) See "Recherche Opérationnelle", 1995, Presse des Ponts et Chaussées, page 102, by A.Henry-Labordere.

The SMS-MT is then sent in classical manner using MAP Forward Short Message MT and a new entry is made in the cache memory (4) which is updated.

The initial HLR levels when they are empty are built from the HLR list (1).

The look up of the cache memory may use an optimised search method such as a binary dichotomy. The number of memory searches for 3,000,000 subscribers in the table is less than 20 in average if the numbers are kept in increasing order each time a number is added in the cache. In our implementation we use 8 octets for each Destination Address and 8 for its HLR address (using floating point representation), so the total is 48 M octets which is easily available in a medium size server without a complicated Data Base. In case this Data Base would be erased by accident, it would automatically rebuild by auto-learning.

If it finds the destination address in the cache, but the HLR responds "unknown subscriber" it means that the subscriber has ported-out its number and a search is performed as above. In overall, it is measured that a full search of 15 HLRs takes about 12 sec. Due to the response time of the HLRs and the SS7 transmission delay. So a search of the HLRs is only required, initially, and if a subscriber is port-out to an other network.

Figure 2:
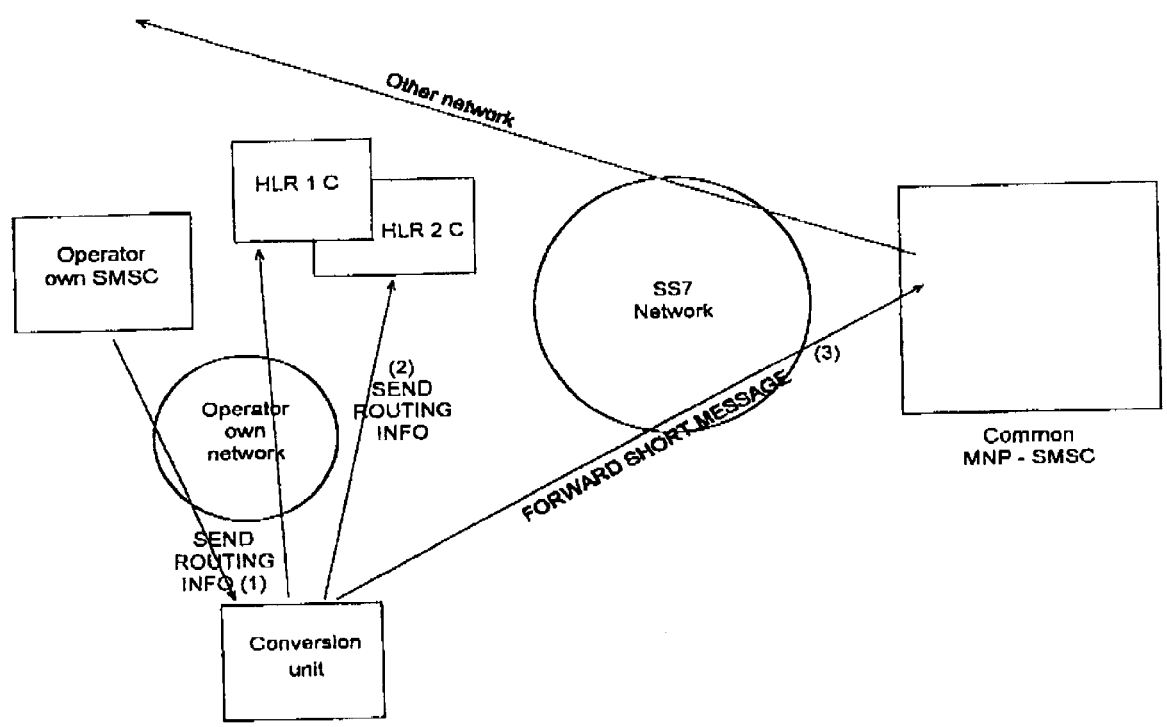
Figure 3:
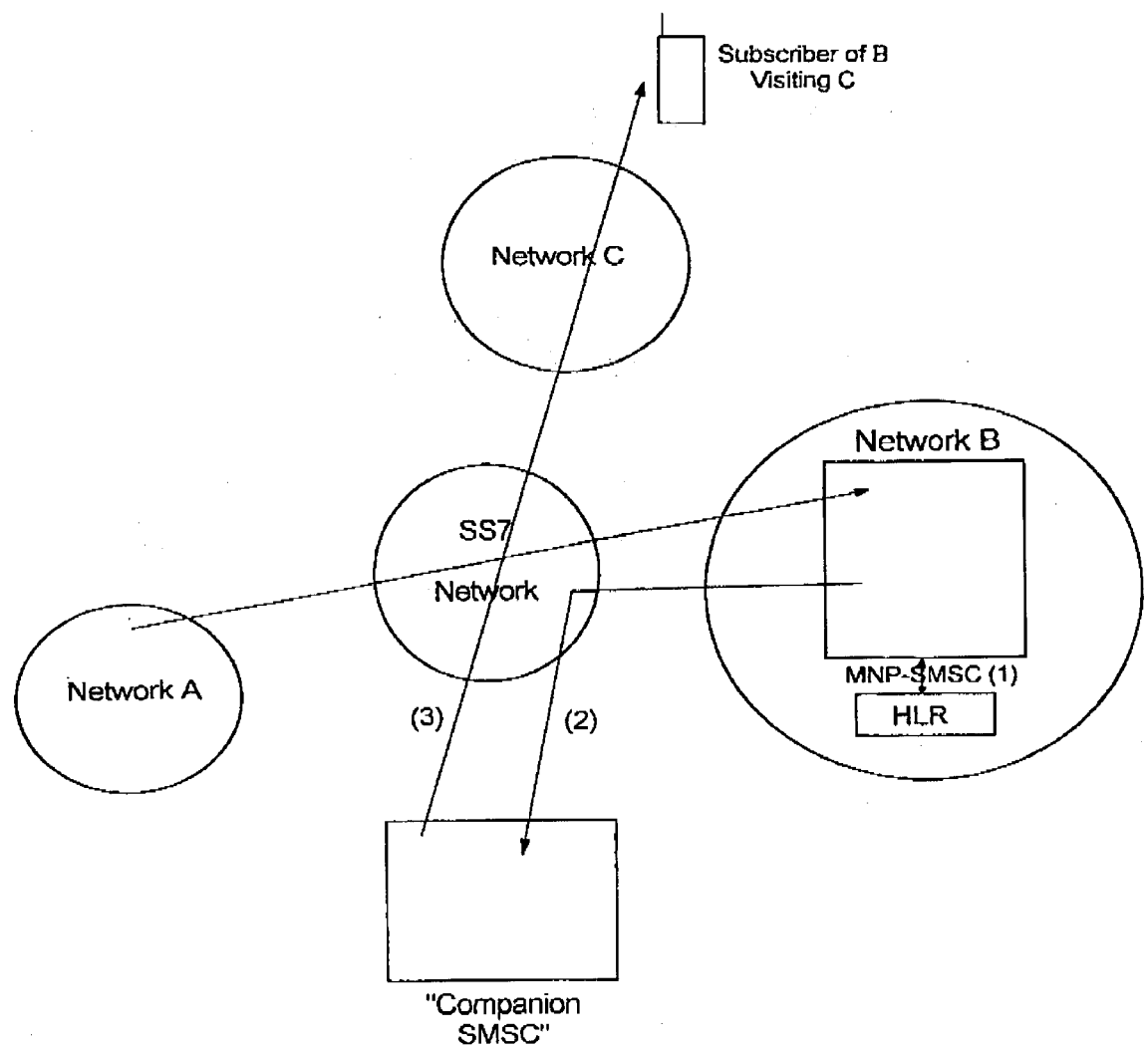

To improve the above operation as explained in FIG. 2, but not mandatory, each operator can have its own "Conversion Unit", which it sees as an HLR, in order that the messages that he sends to his own subscribers do not go to the common MNP-MSC. Their SMSC interrogates (1) this "CU" which it turns interrogates its real HLRs (2) to find if it is a real subscriber. If not, the "CU" sends the SMS to the common "MNP-SMSC" (3).

AUTO-LEARNING OF THE HLR LEVELS

Even without MNP, the maintenance of the HLR levels must be done automatically to provide service quality and minimise the costs, according to our invention.

In order to do this, a SMSC with the same features as the MNP-SMS is used when it is necessary to send SMS to a network when the HLR levels are unknown, not fully known or changing.

It is necessary to have the list of HLRs (4 below) but the HLR levels could be empty (one single interval, the same for all the HLRs) such as:

| Min | Max | HLR address |
| --- | --- | --- |
| +886935000010 | +886935999999 | +886935000001 |
| +886935000010 | +886935999999 | +886935000002 |
| +886935000010 | +886935999999 | +886935000003 |
| +886939000000 | +886939999999 | +886935000001 |

We always look in the level given by the current table, but most likely +886935000001 is not the HLR for +886935032000 so a search is performed which finds the number in HLR +886935000003, so that the intervals are reorganised as such by splitting at the half:

| Min | Max | HLR address |
| --- | --- | --- |
| +886935000010 | +886935434000 | +886935000003 |
| +886935434001 | +886935999999 | +886935000001 |
| +886935000010 | +886935999999 | +886935000002 |
| +886935000010 | +886935999999 | +886935000003 |
| +886939000000 | +886939999999 | +886935000001 | so that next time the number will be found directly, as well as all in its neighbour, otherwise the splitting process will continue until the HLR levels converge (do not change any more) which requires only a few hundreds sending of SMS for a medium size operator.

In case a new HLR is added, the new subscriber will be found only after a search and added. He process is thus auto-learning and requires manual entries only when new HLRs are added.

SENDING FROM HOME OPERATOR A TO VISITED OPERATOR C WITHOUT A DIRECT ROAMING AGREEMENT WITH A

The MNP-SMSC acts as relay or a "SMS proxy" between the networks A and C. A can send the SMS to the MNP-SMSC because the MNP-SMSC it is hosted in the network B which has roaming agreements with A.

The MNP-SMSC interrogates (1) the HLR of B to obtain the GT of the visited MSC. It then runs its routing algorithm which tells if the MSC can be reached indirectly (in network C with roaming agreements with B) or in an other.

In the later case, the MNP-SMSC sends the message (2) to a "companion MNP-SMSC" hosted in a network which has roaming agreements with C, the data including the GT of the visited MSC.

The companion MNP-SMSC will just send (3) the ordinary MAP FORWARD_SHORT_MESSAGE_MT to the destination handset through the visited MSC, it has roaming agreements with.

As a result network A has been able to send a SMS to the visited network C which do not have a direct roaming agreement, thanks to the use of a "SMS proxy".

What is claimed is:

1. Method of sending short SMS messages to mobile networks having number portability within the same country, characterised in that a computer with SS7 connections is used as an SMSC relay to relay the short messages sent by an operator A to a subscriber of a network B visiting another network C, the latter having no roaming agreement with network A, by sending the short SMS message with the global title GT of the visited MSC to a companion SMSC in a network which does have a roaming agreement with network C, said computer capable of interrogating all the HLRs of the country in which the number portability is operated, said computer having a cache memory for all the mobile subscribers of the country in which the portability is operated so that the computer will know which HLR to interrogate, without searching, once the HLR has been found a first time.

2. Method as claimed in claim 1, characterised in that the cache memory is initially empty and is built progressively by HLR searches performed whenever a subscriber is not yet registered in the cache memory or a subscriber has changed subscriber networks.

3. Method as claimed in claim 2, characterised in that the numbering system (HLR levels) is built by auto-learning and sequential interrogation of the HLR whenever a subscriber is not found in the existing system.

4. Method as claimed in claim 1, characterised in that the list of HLR of an operator is built by systematic parallel searching run by a computer.

5. Method as claimed in claim 1, characterised in that the computer is integrated in an international gateway IGP, a national gateway NGP or in the GMSC or GMSCs of an operator.

* * * * *